United States Patent
Liu et al.

(10) Patent No.: US 11,321,484 B2
(45) Date of Patent: *May 3, 2022

(54) METHODS AND SYSTEMS FOR LEVERAGING EXISTING USER DATA TO VERIFY USER CREDENTIALS

(71) Applicant: Capital One Services, LLC, McLean, VA (US)

(72) Inventors: Ya Liu, McLean, VA (US); Matthew Carson, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/883,680

(22) Filed: May 26, 2020

(65) Prior Publication Data

US 2021/0117568 A1    Apr. 22, 2021

Related U.S. Application Data

(63) Continuation of application No. 16/654,046, filed on Oct. 16, 2019, now Pat. No. 10,685,137.

(51) Int. Cl.
| | |
|---|---|
| *G06F 7/04* | (2006.01) |
| *G06F 12/00* | (2006.01) |
| *G06F 12/14* | (2006.01) |
| *G06F 13/00* | (2006.01) |
| *G11C 7/00* | (2006.01) |
| *G06F 21/62* | (2013.01) |
| *H04L 29/06* | (2006.01) |
| *G06F 16/2455* | (2019.01) |
| *H04W 12/06* | (2021.01) |
| *H04W 12/02* | (2009.01) |

(52) U.S. Cl.
CPC ...... *G06F 21/6245* (2013.01); *G06F 16/2455* (2019.01); *H04L 63/08* (2013.01); *H04W 12/02* (2013.01); *H04W 12/06* (2013.01)

(58) Field of Classification Search
CPC .. G06F 21/6245; G06F 16/2455; G06F 21/31; H04L 63/08; H04L 63/101; H04L 63/0407; H04W 12/06; H04W 12/02
See application file for complete search history.

(56) References Cited

U.S. PATENT DOCUMENTS

| | | | | |
|---|---|---|---|---|
| 10,911,425 B1* | 2/2021 | Hitchcock | ............... | H04L 63/08 |
| 2011/0166869 A1* | 7/2011 | Froelich | ................ | G06Q 10/10 |
| | | | | 705/1.1 |
| 2015/0127547 A1* | 5/2015 | Powell | ................ | G06Q 20/385 |
| | | | | 705/67 |
| 2016/0087957 A1* | 3/2016 | Shah | ....................... | H04L 63/08 |
| | | | | 726/1 |
| 2016/0335639 A1* | 11/2016 | Merz | ...................... | G06Q 20/12 |
| 2017/0364917 A1* | 12/2017 | Karantzis | .............. | G06Q 50/01 |
| 2017/0374070 A1* | 12/2017 | Shah | .................... | H04L 63/105 |

* cited by examiner

*Primary Examiner* — Trong H Nguyen
(74) *Attorney, Agent, or Firm* — Perkins Coie LLP

(57) ABSTRACT

Methods, systems, and devices for leveraging data already collected on a user in a secure and private manner, in particular to verify user credentials for third parties. The methods, systems, and devices innovate beyond traditional security and privacy platforms in computer systems by processing the data to create a useable metric for the purposes of the third parties, in which the useable metric preserves the security and privacy of the underlying data.

18 Claims, 5 Drawing Sheets

METHODS AND SYSTEMS FOR LEVERAGING EXISTING USER DATA TO VERIFY USER CREDENTIALS

CROSS-REFERENCE TO RELATED APPLICATION(S)

This application is a continuation of U.S. patent application Ser. No. 16/654,046, filed on Oct. 16, 2019. The content of the foregoing application is incorporated herein in its entirety by reference.

FIELD OF THE INVENTION

The invention relates to protecting the security and privacy of personal data while verifying user credentials.

BACKGROUND

In recent years, the amount and uses of personal data on a given user has increased exponentially. Along with the rise in both the amount and uses for this data, concerns about protecting this data has also increased. While encryption and other typical security measures are available to securely transmit data, to use the data it must be decrypted and accessible by a third party, which gives rise to privacy concerns.

SUMMARY

Methods, systems, and devices are disclosed herein for leveraging data already collected on a user in a secure and private manner, in particular to verify user credentials for third parties. The methods, systems, and devices disclosed herein innovate beyond traditional security and privacy platforms in computer systems by processing the data to create a useable metric for the purposes of the third parties, in which the useable metric preserves the security and privacy of the underlying data. For example, many companies collect data on users. This data may indicate demographic, financial, and/or geographical characteristics of the user such as the user's credit history, income level, marital status, job history, etc. In many instances, this data, which is readily available from one institution (e.g., a bank at which a user has a bank account), is exactly the type of data that another institution (e.g., a rental car company) needs when interacting with the user (e.g., to rent a car to the user). However, due to privacy and security concerns, the first institution has no mechanism for sharing this information with the second, even if it is to the benefit of the user (e.g., allows the user to qualify for a car rental).

One alternative to overcome this problem is to rely on third party providers to calculate industry-standard metrics (e.g., a credit score) that may be used by institutions wanting to verify the credentials of the user (e.g., income level, marital status, job history, etc.). However, while such industry-standard metrics obfuscate the underlying data and thus protect the underlying data, the industry-standard metrics do not allow for institutions to target particular criteria (e.g., employment history) that may be particularly relevant to their interaction with the user. For example, while a user may have a poor credit score, the main concern of the institution may not be a credit score, but whether the user is currently employed. By relying on only the industry-standard metric (i.e., credit score), the institution has no ability to determine whether a particular criterion (e.g., employment status) is met. In contrast, if an institution was able to select the particular criterion, and only the particular criterion, for a metric, the underlying data would not be protected and secured because a metric based solely on the particular criterion would not obfuscate the underlying data. Thus, there exists a tension between providing third parties with a metric that fulfills their needs (and verifies particular credentials about a user) and protects the privacy and security of the underlying data.

The methods, systems, and devices disclosed herein balance this tension and both provides third parties with a custom metric that fulfills their needs while protecting the privacy and security of the underlying data through. Specifically, the system generates a metric (i.e., an assurance level) that is tailored to the needs of the third party (i.e., requestor of the verification of the user credentials), but uses both confidential criteria and algorithms to create the metric in order to protect the security and privacy of the user's data. To tailor the metric to the needs of the user, the system first categorizes the user data into categories necessary to fulfill the request based on information about the requestor and request (e.g., the type of the verification request, the identity of a requestor of the verification request, and the required type of metric of the verification request). These categories of data then become the criteria (e.g., variables) used to create the custom metric. The system further protects the underlying data by using various algorithms for generating the custom metric, in which each of the potentially selectable algorithms use the selected criteria and generate assurance levels in the required type. By creating custom criteria based on categories of data, which is selected based on the requestor, and selecting an algorithm from a plurality of potential algorithm that meet the purposes of the requester, the system balances the tension of providing third parties with a custom metric that fulfills their needs while protecting the privacy and security of the underlying data.

In one aspect, the system for protecting personal data while verifying user credentials may comprise a database configured to store user data for a user and control circuitry configured. The system may store, in the database of a verification service, user data for a user. For example, the user data may be data collected about the user (e.g., name, address, income level, credit score, etc.) from one or more entities (or the verification service itself). The service may receive, from a remote server (e.g., the remote server of a third party wishing to verify the credentials of the user), a verification request for credentials of the user. For example, the verification request may be a request directed to verifying information about the user (e.g., the income level of the user), which the user submitted in an interaction with the third party.

The verification request may indicate various information about the requestor and the information needed by the requestor. The system may use this information to create a custom metric that responds to the request, while simultaneously protecting the privacy and security of the user's data. For example, the verification request may indicate a type of the verification request, an identity of a requestor of the verification request, and a required type of assurance level of the verification request. The system may use the type of verification request, which may indicate the purpose of the request (e.g., bank loan, car rental, employment application, etc.), a level of importance of the request, a category of the request, etc. to determine a category of data for the verification request. Likewise, the system may use the identity of the requestor to better target the determination of the category, but also screen potential security risks (e.g., if the requestor is not determined by the system to be a known institution operating in good faith). Finally, the system may use the required type of assurance level to both determine whether or not the required type of assurance can be provided (e.g., based on current user data, available algorithms, user security settings, etc.).

The system then determines, using the control circuitry, a category of required data for the verification request based on the type of the verification request, the identity of the requestor, and the required type of assurance level. For example, as a first layer in protecting both the security and privacy of the user data, the system can process the underlying user data into categories. These categories may correspond to existing categories of user data or may be aggregations of various separate categories of the user data as stored in the verification database. That is, while the verification database may store current income and current debt level as separate categories, the system may aggregate this data from its native form into a custom category (e.g., "fiscal health") for the purposes of the verification request. By creating this custom category, the underlying user data is both secure and kept private. The system can determine, based on the type of the verification request, the identity of the requestor, and the required type of assurance level, which custom categories are required, what information needs to be included in a custom category, etc. To determine which custom categories are required, what information needs to be included in a custom category, etc. the system may rely on proprietary algorithms built on industry standards, preferences of the requestor, and/or past practices.

The system then determines, using the control circuitry, whether the stored user data includes the category. For example, after determining the category or categories of data that are necessary for the verification. The system verifies that it has the necessary information. In response to determining that the stored user data includes the category, determining, using the control circuitry, whether criteria based on the stored user data in the category is approved for use in responding to the verification request. For example, even though the underlying user data is being protected, the system may verify that the stored user data is approved for this protected use by the system. The system may obtain this approval through direct user authorization, terms or service, or other means.

In response to determining that the criteria are approved for use in responding to the verification request, the system selects, using the control circuitry, an algorithm for responding to the verification request from a plurality of potential algorithms for responding to the verification request. For example, by using a plurality of algorithms as opposed to a single algorithm, the system introduces a second layer of protection as third parties that repeatedly use the system are not able to reverse engineer the algorithms to determine the criteria used. Furthermore, each of the plurality of potential algorithms uses the criteria and generates assurance levels in the required type; therefore, the output to the requestor (i.e., the assurance level of the verification request) is presented in a uniform manner. The system then generates, using the control circuitry, an assurance level, in the required type, of the credentials of the user based on the selected algorithm. The use of an assurance level, which may be a quantitative or qualitative metric of the confidence level of the verification service in the user's credentials (as opposed to simply presenting user data) introduces a margin of error that can account for any variations in the assurance level due to different algorithms, criteria, etc. The system then outputs the assurance level for display on a user device. As the system has used multiple layers of protection for the user data in terms of both privacy and security to generate the assurance level, and the assurance level itself does not represent user data, the system provides a mechanism for leveraging data already collected on the user in a secure and private manner to verify user credentials for third parties.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
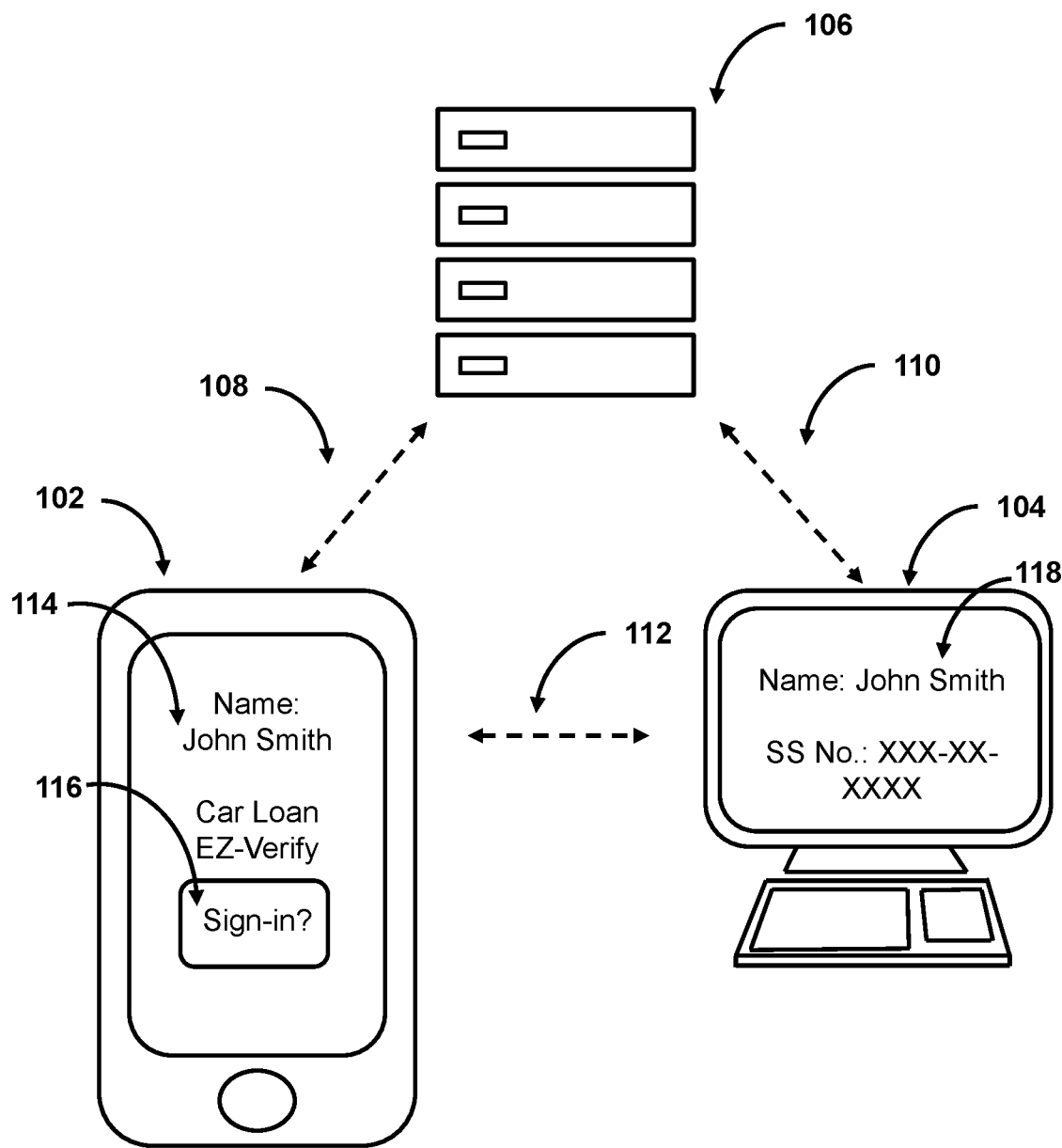
FIG. 1 shows an illustrative system for leveraging data already collected on the user in a secure and private manner to verify user credentials for third parties, in accordance with one or more embodiments.

FIG. 1 shows an illustrative system for leveraging data already collected on the user in a secure and private manner to verify user credentials for third parties, in accordance with one or more embodiments. As shown in FIG. 1, system 100 may include mobile device 102 and user terminal 104. While shown as a smartphone and personal computer, respectively, in FIG. 1, it should be noted that mobile device 102 and user terminal 104 may be any computing device, including, but not limited to, a laptop computer, a tablet computer, a hand-held computer, other computer equipment (e.g., a server), including "smart," wireless, wearable, and/or mobile devices. FIG. 1 also includes server 106. Server 106 may alternatively be any computing device as described above and may include any type of mobile terminal, fixed terminal, or other device. It should also be noted that system 100 is not limited to three devices. Users may, for instance, utilize one or more other devices to interact with one another, one or more servers, or other components of system 100. It should be noted that, while one or more operations are described herein as being performed by particular components of system 100, those operations may, in some embodiments, be performed by other components of system 100. As an example, while one or more operations are described herein as being performed by components of primary device 104, those operations may, in some embodiments, be performed by components of server 106. In some embodiments, the various computers and systems described herein may include one or more computing devices that are programmed to perform the described functions.

With respect to the components of mobile device 102, user terminal 104, and server 106, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing circuitry. Each of these devices may also include a user input interface and/or user output interface (e.g., a display) for use in receiving and displaying data. For example, as shown in FIG. 1, both mobile device 102 and user terminal 104 include a display upon which to display data. Additionally, as mobile device 102 and user terminal 104 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or another suitable program). The application may cause the processors and/or control circuitry to perform operations related to the verification service (e.g., either transmitting verification requests, receiving verification requests, and/or processing verification requests). For example, the processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 1 also includes communication paths 108, 110, and 112. Communication paths 108, 110, and 112 may include the Internet, a mobile phone network, a mobile voice or data network (e.g., a 4G or LTE network), a cable network, a public switched telephone network, or other types of communications network or combinations of communications networks. Communication paths 108, 110, and 112 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

As shown in FIG. 1, the system for leveraging data already collected on the user in a secure and private manner to verify user credentials for third parties may include multiple components. One component may be an application running on a mobile device of a user (e.g., mobile device 102. Using this component, the system may provide a verification service for a user that allows the user to quickly and easily gain approval for different transactions (e.g., a car loan as shown in FIG. 1). The system may allow a user to enter user-provided data (e.g., as discussed in FIG. 3 below) such as user-provided data 114. Through the user of the application, the system may allow a user to transmit a verification request (e.g., via on-screen icon 116) using mobile device 102. In response to receiving the verification request, the verification service (e.g., located at server 106) may process the request in order to allow the user to quickly and easily conduct that transaction. Another component of the system shown in FIG. 1 is user terminal 104. Similar to the user of mobile device 102, the system may allow a requestor to verify information about the user by submitting a verification request user information (e.g., user information 118) to the verification service located at server 106.

Server 106 may be a database configured to store user data for a user. For example, the database may include user data that the verification service has collected about the user through prior transactions. Alternatively or additionally, the verification service may act as a clearinghouse for multiple sources of information about the user. When verifying the user's credentials, the system may access these multiple sources as discussed below in FIG. 4. Server 106 may also include control circuitry configured to perform the various operations needed to verify the credentials of the user. For example, server 106 may receive, from mobile device 102 or user terminal 104, a verification request for credentials of the user and user-provided data corresponding to the verification request.

The verification request may be structured as an API request that includes a URL, body, and method. The API request may correspond to one half of the API request-response cycle between one or more devices and/or applications to complete the verification request. For example, the system (e.g., mobile device 102 and server 106) may communicate in HTTP (Hyper Text Transfer Protocol)

through a request-response cycle. To make a valid request, the requester (e.g., mobile device 102) may include a URL (Uniform Resource Locator), method, list of headers, and/or body. The URL may indicate to the verification service what resources to use (e.g., "VerficiationServiceApplication"). The body may contain headers and data. The headers may provide metadata about the verification request (e.g., the types of information included) and the body may indicate the name of the user for which credentials need to be verified, user-provided data, and other information used by the verification service.

For example, the verification request may indicate a type of the verification request, an identity of a requestor of the verification request, and a required type of assurance level of the verification request. For example, the verification service may have multiple types of verification requests, which may differ by the subject matter of the request, the service being performed, a monetary amount at issue in the request, etc. The system may have custom rules and requirements for each verification request. The identity of the requestor may be transmitted as a company name, as an account number with the verification service, and/or any other identifier that allows the verification to distinguish the requestor from other requestors. Finally, the verification request may include a type of assurance level. The type of assurance level may include whether or not the assurance level is a qualitative or quantitative assessment of the confidence in the verification service's assurance. For example, the level of assurance may be expressed as a percentage of confidence, a tier of confidence (e.g., a grade), and/or a binary decision. The system may express the assurance level as a textual, graphical, and/or multimedia indicator (e.g., on mobile device 102 or user terminal 104).

Server 106 may determine a category of required data for the verification request based on the type of the verification request, the identity of the requestor, and the required type of assurance level. In some embodiments, the determination of what categories of user data that are required for the verification request based on the type of the verification request, the identity of the requestor, and the required type of assurance level may be determined based on industry standards, legal requirements (e.g., to protect the privacy of the user), and/or based on subject matter.

Server 106 may determine whether the user-provided data includes the category. As the naming conventions, format, and value types of the category may differ from that of the user data (as stored at server 106 or as stored at another source as discussed in FIG. 4 below), server 106 may use matching algorithms that may support exact match techniques and/or partial or "fuzzy" matching logic (e.g., searching for a closest match) to locate alternate spellings, naming conventions, etc. for user data. For example, a column name associated with user data may be compared to a required category (e.g., debt level) for the verification request. Based on the degree of similarity between the headings a "similarity rating" may be assigned using any suitable algorithm or weighting logic.

Upon determining that the user-provided data includes the category. Server 106 may verify the user-provided data in the category using the stored data. Server 106 may once again use matching algorithms for this purpose. Additionally, server 106 may look for substantial similar of the values in order to verify the data. This may include looking for alternate spellings and/or number values (e.g., indicating income level) to be within a given range. In response to verifying the user-provided data in the category, server 106 may select a default algorithm for responding to the verification request. The default algorithm may be selected by the requestor and/or a known industry standard (as the fact that the user provided the data negates the security and privacy concerns). Server 106 may then generate an assurance level of the credentials of the user based on the default algorithm.

In contrast, in response to determining that the user-provided data does not include the category, server 106 may determine whether the stored user data includes the category. If not, server 106 may generate an API response to mobile device 102 querying the user for user data and/or generate an API response to user terminal 104 querying the requestor for user data. If so, server 106 may select criteria based on the stored user data.

As referred to herein, the criteria or criterion based on user data (whether stored user data or user-provided data) may include a normalized value based on the values associated with the user data included with the category. For example, a given category (e.g., fiscal health) may include multiple categories of underlying user data (i.e., actual user data) such as income level, debt level, etc. In generating a criterion or criteria for use, server 106 generates a numerical score for each category of underlying data. For example, the income level of the user may be represented as by a numerical value indicating the percentage of the general population for which the user has a higher income level. In another example, the debt level of the user may be represented as by a numerical value indicating the percentage of the general population for which the user has a higher debt level. Non-numerical data points (e.g., gender, marriage status, number of children) may also be expressed as a numerical value.

In some embodiments, server 106 may determine whether criteria based on the stored user data in the category are approved for use in responding to the verification request in response to determining that the stored user data includes the category. For example, while no underlying user data (i.e., actual data) is being used, server 106 may still verify that the user approves of this use.

Server 106 may then select an algorithm that uses these criteria in order to generate the assurance level. For example, server 106 may select an algorithm for responding to the verification request from a plurality of potential algorithms for responding to the verification request, wherein each of the plurality of potential algorithms uses the criteria and generates assurance levels in the required type. In some embodiments, the system may select the algorithm based on the type of the verification request, the identity of the requestor, and the required type of assurance level.

In some embodiments, the system may select the algorithm based on whether or not the requestor is a frequent or high-volume requestor. Alternatively, the system may determine whether the volume of requests is suspicious (e.g., a brute force hack). In response to the high-volume of requests, the system may vary the algorithm or select different algorithms. For example, the system may determine a number of verification requests received from the requestor during a time period. The system may then compare the number of verification requests received from the requestor during the time period to a respective number for each of the plurality of potential algorithms. The system may then match the number of verification requests received from the requestor during the time period to the respective number of to the selected algorithm.

In some embodiments, the system may select the algorithm based on a time limit for outputting assurance levels. For example, some algorithms may require longer computational period to calculate. As the number of requests increase, the system may select algorithms that can be calculated more quickly in order to reduce bottlenecks. Alternatively, if there are no bottlenecks (or threat of bottlenecks), the system may select an algorithm that takes longer to calculate, but is more accurate or used less frequently (e.g., in order to increase the diversity of algorithms). For example, the system may determine a time limit for outputting the assurance level. The system may then compare the time limit to a respective time limit for each of the plurality of potential algorithms. The system may then select an algorithm in response to matching the time limit to the respective time limit for the algorithm.

In some embodiments, the system may select the algorithm based on a geographic location of the remote server and/or the requestor. For example, regional, national, or geographic differences may cause differences in the expectation and/or legal requirements for the verification service. For example, the system may determine that a particular requestor is subject to particular data privacy rules that require the use of a particular algorithm. As such, the system may determine a geographic location of the remote server, and compare the geographic location to a respective approved geographic location for each of the plurality of potential algorithms. Upon matching the geographic location to the respective approved geographic location for the algorithm, the system selects the algorithm.

In some embodiments, the system may select the algorithm based on the type of user data being used. For example, some user's data (e.g., personally identifying information) may be subject to particular legal rules and therefore the system may select algorithms that meet those requirements. For example, the system may determine that the category includes a type of personally identifying information. The system may then select an algorithm from the plurality of algorithms approved for that type of data.

After selecting the algorithm and processing the criteria using the algorithm, server 106 generates an assurance level, in the required type, of the credentials of the user based on the selected algorithm. For example, if the verification request requires a particular type of assurance level (e.g., one having a particular format, degree of confidence, etc.), server 106 generates the assurance level using the selected algorithm. Server 106 then outputs the assurance level for display on mobile device 102 or user terminal 104. For example, the assurance level may be transmitted to mobile device 102 or user terminal 104 in the body of an API response.

Figure 2:
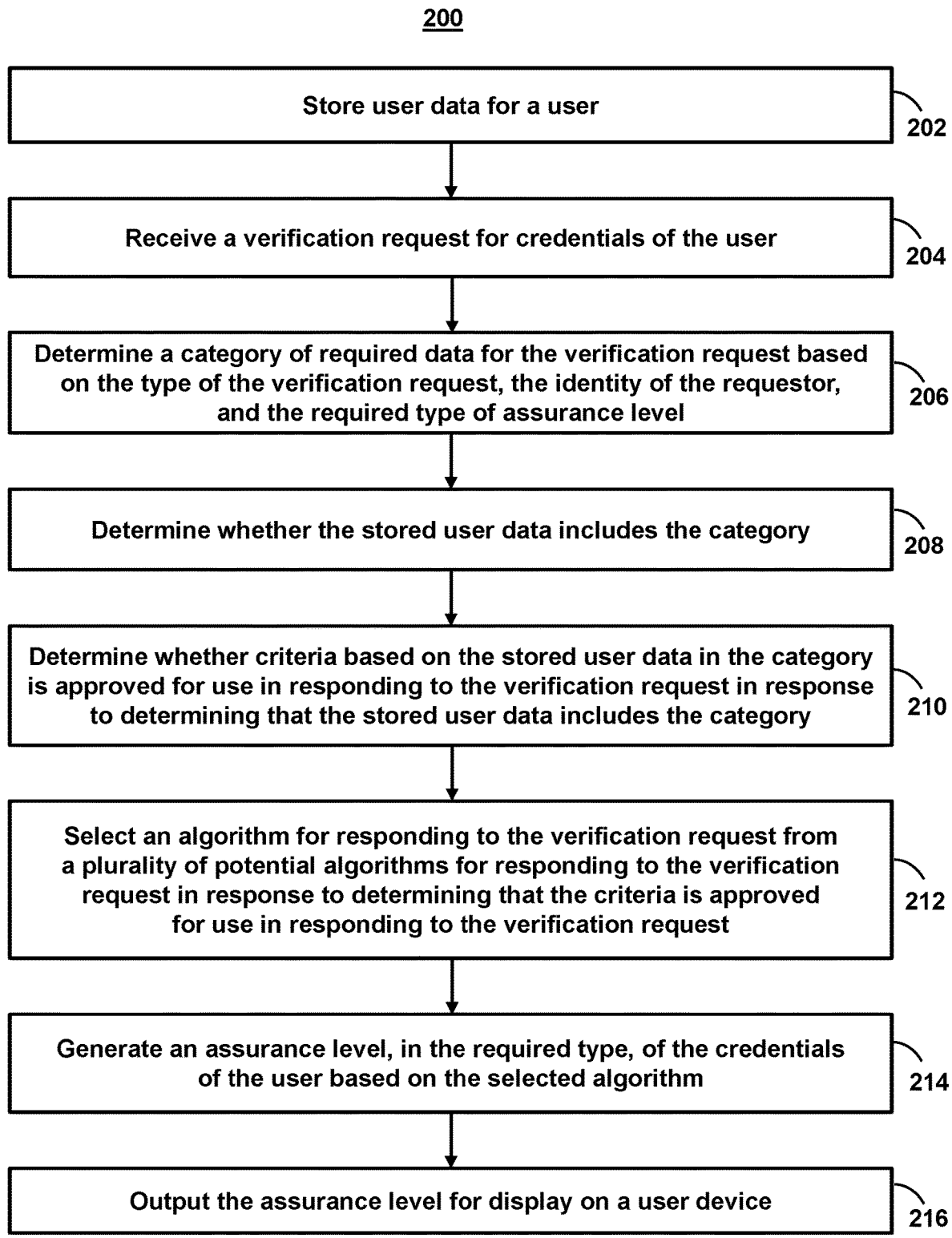
FIG. 2 shows a flowchart of the steps involved in outputting an assurance level in response to a verification request, in accordance with one or more embodiments.

FIG. 2 shows a flowchart for outputting an assurance level in response to a verification request. For example, process 200 may represent the steps taken by one or more devices as shown in FIG. 1 to protect personal data while verifying user credentials.

At step 202, process 200 stores (e.g., in a database of a verification service) user data for a user. For example, the verification service may be performed by a first institution that has previously collected user data (or has collected user data from multiple other institutions). The user data may be stored in a user profile and/or associated with a user account for the user.

At step 204, process 200 receives (e.g., from a remote server) a verification request for credentials of the user. The verification request may indicate a type of the verification request, an identity of a requestor of the verification request, and a required type of assurance level of the verification request. For example, the verification request may be received from a second institution. The verification request may be formatted in a particular manner or using a particular application programming interface or built upon a software development kit of the verification service.

At step 206, process 200 determines (e.g., using control circuitry) a category of required data for the verification request. Process 200 may base this determination on the type of the verification request, the identity of the requestor, and the required type of assurance level. In some embodiments, process 200 may use additional information either included with the verification request and/or associated with the verification service. For example, process 200 may further use the name (or other information about the user) to determine a required category. Alternatively or additionally, process 200 may retrieve additional information about the requestor (e.g., mandatory protocols of the requestor) or the type of the verification request (e.g., mandatory protocols for the type of verification request) to determine additional categories of information needed.

At step 208, process 200 determines (e.g., using the control circuitry) whether the stored user data includes the category. For example, as process 200 attempts to leverage existing user data, process 200 first determines whether the correct (or enough) user data is available. In some embodiments, complex, flexible matching algorithms that may support exact match techniques and/or partial or "fuzzy" matching logic (e.g., searching for a closest match) may be used to locate data using similar naming conventions and/or format. Process 200 may determine this by matching fields of user data stored in the database to the required categories. In some embodiments, process 200 may retrieve data from multiple fields of the database. In some embodiments, in response to determining that the stored user data does not include the category, process 200 may input the category into a database listing sources of categories of user data to determine a source to query for the category. For example, in some embodiments, the verification service may access user data housed and/or collected by other institutions and/or third parties as discussed below in FIG. 4. Process 200 may then query the source for source data corresponding to the category and receive the source data corresponding to the category.

At step 210, process 200 determines (e.g., using the control circuitry) whether criteria based on the stored user data in the category is approved for use in responding to the verification request in response to determining that the stored user data includes the category. For example, in order to protect both the security and privacy of user data, process 200 may determine whether or not the user has explicitly (e.g., via a user selection or acknowledgement) or implicitly (e.g., as a term of service) given permission for process 200 to base criteria on stored user data. In response to determining that the criteria based on the category are not approved for use in responding to the verification request, process 200 queries the requestor for data in the category. It should be noted that in some embodiments, step 210 is optional and may be bypassed.

At step 212, process 200 selects (e.g., using the control circuitry) an algorithm for responding to the verification request from a plurality of potential algorithms for responding to the verification request in response to determining that the criteria are approved for use in responding to the verification request. Each of the plurality of potential algorithms may use the selected criteria and generate assurance levels in the required type. Thus, irrespective of the algorithm selection, the resulting assurance level should be equivalent (e.g., within a margin of error) with respect to verifying the user credentials.

At step 214, process 200 generates (e.g., using the control circuitry) an assurance level, in the required type, of the credentials of the user based on the selected algorithm. For example, the assurance level may be a quantitative or qualitative representation of whether or not the user credentials are verified. Process 200 may express this representation in a textual, graphical, and/or multimedia presentation.

At step 216, process 200 outputs the assurance level for display on a user device. For example, process 200 may generate an icon (e.g., on mobile device 102 (FIG. 1)) or transmit a confirmation of the verification to user terminal 104 (FIG. 1)).

It is contemplated that the steps or descriptions of FIG. 2 may be used with any other embodiment of this disclosure. In addition, the steps and descriptions described in relation to FIG. 2 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one or more of the steps in FIG. 2.

Figure 3:
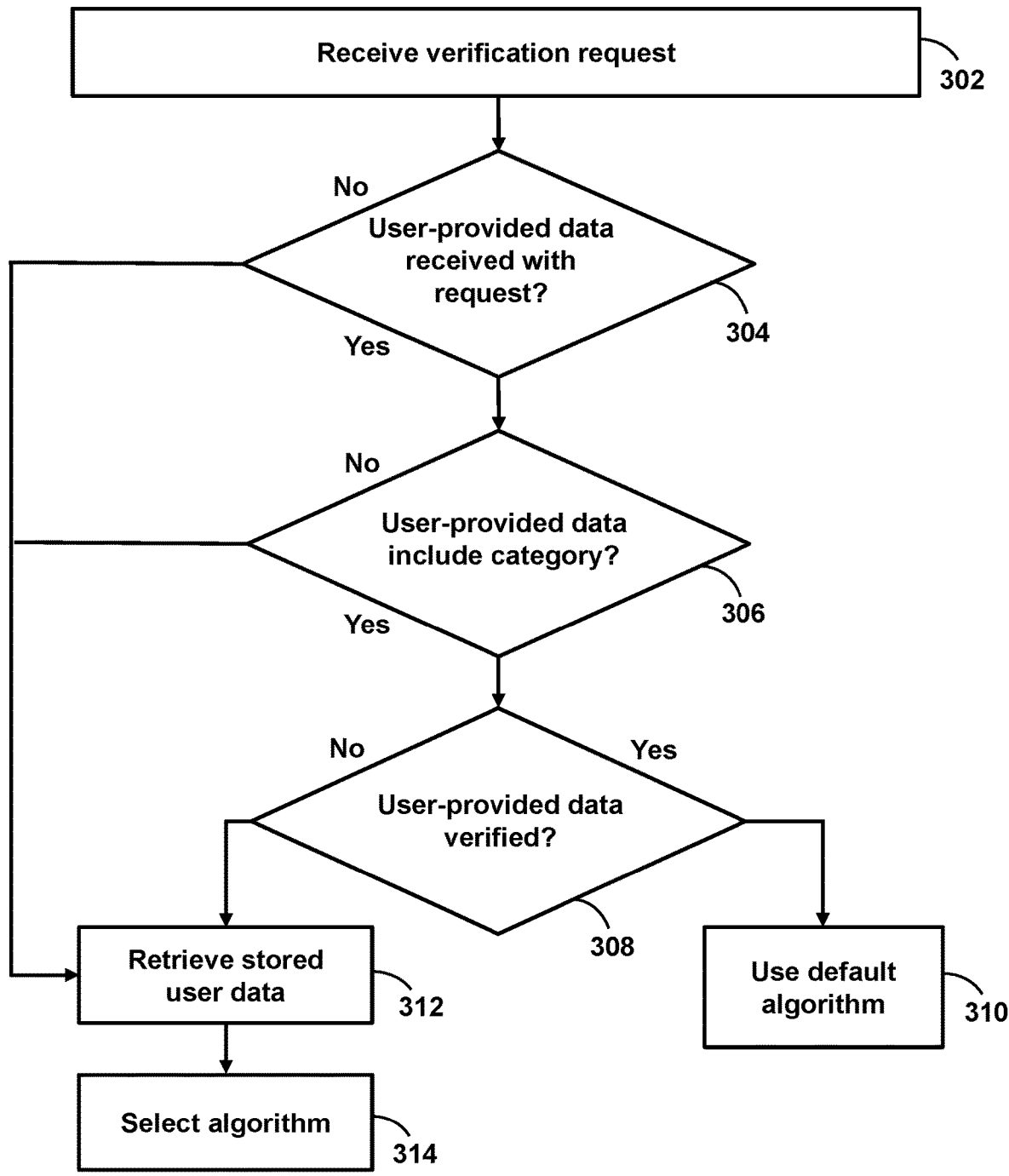
FIG. 3 shows a flowchart of the steps involved in selecting an algorithm for use in generating an assurance level, in accordance with one or more embodiments.

FIG. 3 shows a flowchart for selecting an algorithm for use in generating an assurance level. For example, process 300 may represent the steps taken by one or more devices as shown in FIG. 1 when user-provided data is received. For example, upon receiving a verification request, the system may determine whether user-provided data corresponding to the verification request was received from the remote server. In response to determining that the user-provided data corresponding to the verification request was received, the system may determine whether the user-provided data includes a required category of user data. In response to determining that the user-provided data includes the category, the system may verify the user-provided data in the category using the stored data. In response to verifying the user-provided data in the category, the system may select a default algorithm for responding to the verification request, wherein the default algorithm is selected by the requestor.

At step 302, process 300 receives a verification request (e.g., from mobile device 102 (FIG. 1)). The verification request as an API request that includes a URL, body, and method. At step 304, process 300 determines whether or not user-provided data (e.g., user-provided data 114 (FIG. 1)) was received with the request. For example, a user may have entered some information (e.g., via mobile device 102 (FIG. 1)) prior to the verification request being transmitted. For example, in one example, the verification request may be transmitted from a user terminal (e.g., user terminal 104 (FIG. 1)) located at a requestor's location. The user (e.g., a user interacting with the requestor) may have enter some information into the user terminal in order to be approved for a service (e.g., a car rental) by the requestor. If the verification request is formatted as an API request, this information may appear in the body of the API request. If the request includes user-provided data, process 300 proceeds to step 306. If not, process 300 proceeds to step 312.

At step 306, process 300 determines whether or not the user-provided data includes data in a required category. For example, as discussed above, process 300 may determine a required category of information for the verification request. For example, process 300 may use complex, flexible matching algorithms that may support exact match techniques and/or partial or "fuzzy" matching logic (e.g., searching for a closest match) may be used to locate data using similar naming conventions and/or format. Process 300 may determine whether or not the user-provided data includes data in a required category by matching fields of the user-provided data to required categories. If the user-provided data includes the required category, process 300 proceeds to step 308. If not, process 300 proceeds to step 312.

At step 308, process 300 may determine whether or not the user-provided data is verified. For example, in response to determining that the user-provided data is included in a required category, process 300 may verify that data. Process 300 may verify that this data is correct by comparing the user-provided data to user data of a similar category in the stored data. In some embodiments, if process 300 detects a disparity, process 300 may query the user and/or otherwise notify the requestor of the discrepancy. If the user-provided data is verified, process 300 proceeds to step 310. If not, process 300 proceeds to step 312.

At step 310, process 300 uses a default algorithm. In some embodiments, the default algorithm may be selected by the requestor as the privacy and security of the user data is not in issue as the user provided the data. Alternatively or additionally, process 300 may use a default algorithm, which is available to the requestor and/or preferred by the requestor.

At step 312, process 300 retrieves the stored user data. For example, the user data may be stored in a user profile and/or associated with a user account for the user. Process 300 may then continue on to select an algorithm at step 314. In some embodiments, process 300 may select an algorithm as discussed above. For example, process 300 may select the algorithm based on the type of the verification request, the identity of the requestor, and the required type of assurance level.

It is contemplated that the steps or descriptions of FIG. 3 may be used with any other embodiment of this disclosure. In addition, the steps and descriptions described in relation to FIG. 3 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one of more of the steps in FIG. 3.

Figure 4:
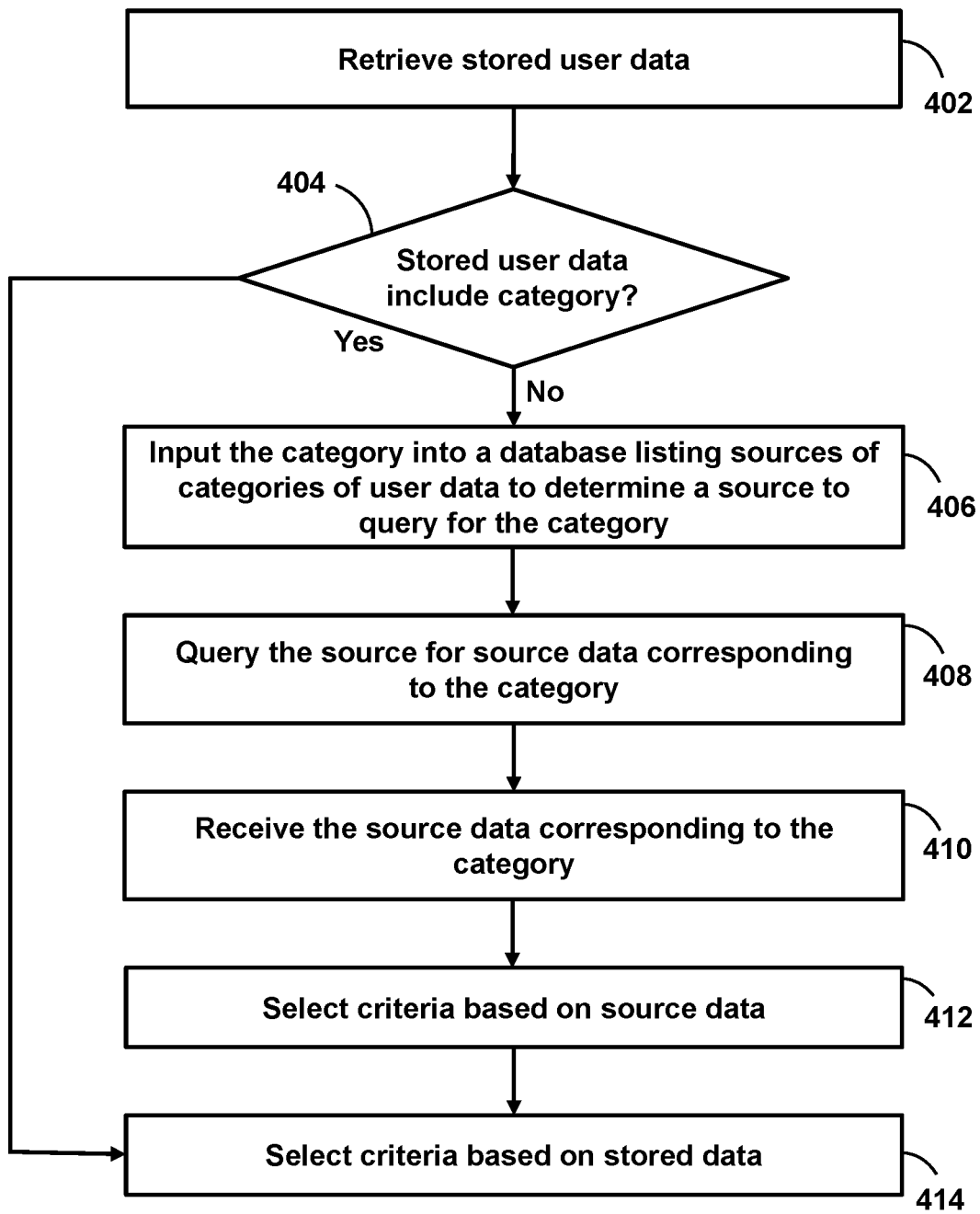
FIG. 4 shows a flowchart of the steps involved in selecting criteria for use in generating an assurance level, in accordance with one or more embodiments.

FIG. 4 shows a flowchart for selecting criteria for use in generating an assurance level. For example, process 400 may represent the steps taken by one or more devices as shown in FIG. 1 when user data is gathered from multiple sources. For example, in response to determining that stored user data does not include a required category, the system may search for another source that has user data in the required category. To do so, the system may input the category into a database listing sources of categories of user data to determine a source to query for the category. Upon finding the source, the system may query the source for source data corresponding to the category and receive the source data corresponding to the category.

At step 402, process 400 retrieves stored user data. For example, process 400 may retrieve stored user data in response to receiving a verification request. At step 404, process 400 determines whether the stored user data is included in a required category (e.g., a category required by the verification request). In response to determining that the stored data is included in the required category, process 400 proceeds to step 414. In response to determining that the stored data is not included in the required category, process 400 proceeds to step 406. For example, the required category of user data may require a type of user data that is not collected by the verification service (or the institution providing the verification service). For example, if the verification service is provided by a financial institution and the category of data relates to health information of the user, the verification service may need to retrieve user data from another source (e.g., a health provider).

At step 406, process 400 inputs the category into a database listing sources of categories of user data to determine a source to query for the category. For example, while this system may not collect user data in the category, the system may track (and catalog) various sources of user data. The database may then output the source of the user data.

At step 408, process 400 receives the source data corresponding to the category. For example, in response to the query, the system may receive the source data corresponding to the category. In some embodiments, the source data may not represent actual user data. Instead, the source data may correspond to a category of data based on the underlying user data collected by the source.

At step 412, process 400 selects criteria based on the source data. For example, the system may select particular criteria (or an algorithm that uses particular criteria as discussed in step 212 (FIG. 2)) based on the source data. In contrast, at step 414, process 400 selects criteria based on the stored data. For example, the system may select particular criteria (or an algorithm that uses particular criteria as discussed in step 212 (FIG. 2)) based on the stored data.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIG. 1 could be used to perform one of more of the steps in FIG. 4.

Figure 5:
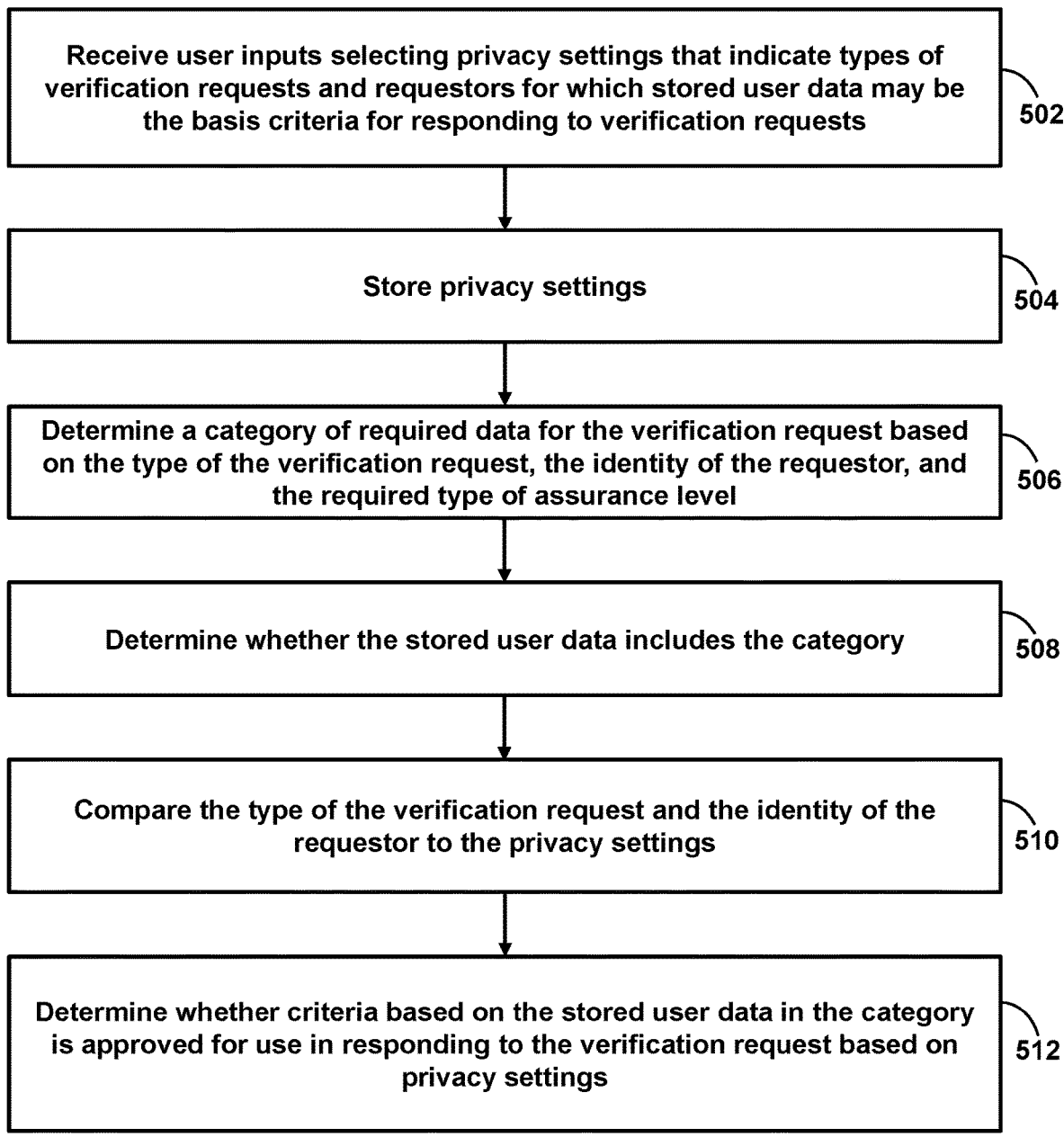
FIG. 5 shows a flowchart of the steps involved in verifying that the use of stored user data is authorized based on user privacy settings, in accordance with one or more embodiments.

FIG. 5 shows a flowchart for verifying that the use of stored user data is authorized based on user privacy settings. For example, process 500 may represent the steps taken by one or more devices as shown in FIG. 1. For example, in some embodiments, the system may determine whether criteria based on a category of user data are approved for use in responding to the verification request. This may comprise the system receiving user inputs selecting privacy settings that indicate: (i) types of verification requests and (ii) requestors for which stored user data is candidate criteria for responding to verification requests. The system may then compare the type of the verification request and the identity of the requestor to the privacy settings.

At step 502, process 500 may receive user inputs selecting privacy settings that indicate types of verification requests and requestors for which stored user data may be the basis criteria for responding to verification requests. In some embodiments, process 500 may receive these privacy settings through explicit user inputs or through implicit terms of service. It should further be noted that in some embodiments, different types of user data may have different privacy settings. For example, personally identifiable information may have a higher privacy setting than other types of settings. In instances where user data may have multiple privacy settings, process 500 may determine the privacy setting applicable to any user data before use. Alternatively, process 500 may determine the privacy setting application to all user data.

At step 504, process 500 stores the privacy settings. For example, in addition to storing user data, the verification service may also store privacy settings that indicate how, to whom, and for what purpose, user data may be used. The privacy settings may be stored with the user data or the privacy settings may be located in a user account or profile that is accessed by process 500.

At step 506, process 500 determines a category of required data for the verification request based on the type of the verification request, the identity of the requestor, and the required type of assurance level. For example, in some embodiments the type of the verification request, the identity of the requestor, and the required type of assurance level may be included with the verification request. Additionally or alternatively, process 500 may retrieve this information from a remote server (e.g., a server associated with the requestor) in response to receiving a verification request. For example, the verification request may include only a serial number of the request. Process 500 may input this serial number into a database of verification requests for the requestor to determine the type of the verification request, the identity of the requestor, and/or the required type of assurance level.

At step 508, process 500 determines whether or not the stored user data includes the category. For example, as discussed above, in some embodiments, complex, flexible matching algorithms that may support exact match techniques and/or partial or "fuzzy" matching logic (e.g., searching for a closest match) may be used to locate data using similar naming conventions and/or format as process 500 matches fields of user data stored in the database to the required categories. In some embodiments, process 500 may retrieve data from multiple fields of the database (e.g., in embodiments in which a single category of data is based on multiple field or categories of data in the database of user data.

At step 510, process 500 may compare the type of the verification request and the identity of the requestor to the privacy settings. For example, process 500 may determine whether or not the particular requestor and/or the type of verification is an approved use of the user data.

At step 512, process 500 determines whether criteria based on the stored user data in the category is approved for use in responding to the verification request based on privacy settings. In response to determining that the particular requestor and/or the type of verification is not an approved use of the user data, process 500 may query the user for approval. Alternatively, process 500 may attempt to modify the type of assurance level and/or other requirements of the verification request.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

The present techniques will be better understood with reference to the following enumerated embodiments:

1. A method for protecting personal data while verifying user credentials, the method comprising: storing, in a database of a verification service, user data for a user; receiving, from a remote server, a verification request for credentials of the user, wherein the verification request indicates a type of the verification request, an identity of a requestor of the verification request, and a required type of assurance level of the verification request; determining, using control circuitry, a category of required data for the verification request based on the type of the verification request, the identity of the requestor, and the required type of assurance level; determining, using the control circuitry, whether the stored user data includes the category; in response to determining that the stored user data includes the category, determining, using the control circuitry, whether criteria based on the stored user data in the category is approved for use in responding to the verification request; in response to determining that the criteria is approved for use in responding to the verification request, selecting, using the control circuitry, an algorithm for responding to the verification request from a plurality of potential algorithms for responding to the verification request, wherein each of the plurality of potential algorithms uses the criteria and generates assurance levels in the required type; generating, using the control circuitry, an assurance level, in the required type, of the credentials of the user based on the selected algorithm; and outputting the assurance level for display on a user device.

2. The method of embodiment 1, further comprising: determining whether user-provided data corresponding to the verification request was received from the remote server; in response to determining that the user-provided data corresponding to the verification request was received, determining whether the user-provided data includes the category; in response to determining that the user-provided data includes the category, verifying the user-provided data in the category using the stored data; and in response to verifying the user-provided data in the category, selecting a default algorithm for responding to the verification request, wherein the default algorithm is selected by the requestor.

3. The method of embodiment 1 or 2, further comprising in response to determining that the criteria based on the category is not approved for use in responding to the verification request, querying the requestor for data in the category.

4. The method of any one of embodiments 1-3, further comprising: in response to determining that the stored user data does not include the category, inputting the category into a database listing sources of categories of user data to determine a source to query for the category; querying the source for source data corresponding to the category; and receiving the source data corresponding to the category.

5. The method of any one of embodiments 1-4, wherein determining whether the criteria based on the category is approved for use in responding to the verification request, further comprises: receiving user inputs selecting privacy settings that indicate types of verification requests and requestors for which stored user data may be the basis criteria for responding to verification requests; and comparing the type of the verification request and the identity of the requestor to the privacy settings.

6. The method of any one of embodiments 1-5, wherein selecting the algorithm, further comprises: determining a number of verification requests received from the requestor during a time period; comparing the number of verification requests received from the requestor during the time period to a respective number for each of the plurality of potential algorithms; and matching the number of verification requests received from the requestor during the time period to the respective number of to the selected algorithm.

7. The method of any one of embodiments 1-6, wherein selecting the algorithm, further comprises: determining a time limit for outputting the assurance level; comparing the time limit to a respective time limit for each of the plurality of potential algorithms; and matching the time limit to the respective time limit for the selected algorithm.

8. The method of any one of embodiments 1-7, wherein selecting the algorithm, further comprises: determining a geographic location of the remote server; comparing the geographic location to a respective geographic location for each of the plurality of potential algorithms; and matching the geographic location to the respective geographic location for the selected algorithm.

9. The method of any one of embodiments 1-8, wherein selecting the algorithm, further comprises: determining that the category includes a type of personally identifying information; and determining that the selected algorithm is approved for personally identifying information.

10. The method of any one of embodiments 1-9, wherein selecting the algorithm is based on the type of the verification request, the identity of the requestor, and the required type of assurance level.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

What is claimed is:

1. A system for protecting personal data while verifying user credentials, the system comprising:
a database configured to store user data for a user;
control circuitry configured to:
receive, from a remote server, a verification request for credentials of the user and user-provided data corresponding to the verification request, wherein the verification request indicates a type of the verification request, an identity of a requestor of the verification request, and a required type of assurance level of the verification request;
determine a category of required data for the verification request based on the type of the verification request, the identity of the requestor, and the required type of the assurance level;
determine whether the user-provided data includes the category;
in response to determining that the user-provided data includes the category:
verify the user-provided data in the category using the stored user data;
generate the assurance level, in the required type, of the credentials in response to verifying the user-provided data in the category;

in response to determining that the user-provided data does not include the category:
   determine whether the stored user data includes the category;
   determine whether criteria based on the stored user data in the category is approved for use in responding to the verification request in response to determining that the stored user data includes the category;
   generate the assurance level, in the required type, of the credentials of the user in response to determining that the criteria are approved for use in responding to the verification request; and
   output the assurance level for display on a user device.

2. The system of claim 1, wherein the control circuitry is further configured to query the requestor for data in the category in response to determining that the criteria based on the stored user data in the category are not approved for use in responding to the verification request.

3. The system of claim 1, wherein the control circuitry is further configured to:
   input the category into a database listing sources of categories of user data to determine a source to query for the category in response to determining that the stored user data does not include the category;
   query the source for source data corresponding to the category; and
   receive the source data corresponding to the category.

4. The system of claim 1, wherein the control circuitry configured to determine whether the criteria based on the stored user data in the category is approved for use in responding to the verification request is further configured to:
   receive user inputs selecting privacy settings that indicate: (i) types of verification requests and (ii) requestors for which stored user data is candidate criteria for responding to verification requests; and
   compare the type of the verification request and the identity of the requestor to the privacy settings.

5. The system of claim 1, wherein the control circuitry configured to select an algorithm based on the type of the verification request, the identity of the requestor, and the required type of assurance level.

6. A method for protecting personal data while verifying user credentials, the method comprising:
   storing, in a database of a verification service, user data for a user;
   receiving, from a remote server, a verification request for credentials of the user, wherein the verification request indicates a type of the verification request, an identity of a requestor of the verification request, and a required type of assurance level of the verification request;
   determining, using control circuitry, a category of required data for the verification request based on the type of the verification request, the identity of the requestor, and the required type of the assurance level;
   determining, using the control circuitry, whether the stored user data includes the category;
   in response to determining that the stored user data includes the category, determining, using the control circuitry, whether criteria based on the stored user data in the category is approved for use in responding to the verification request, wherein determining whether the criteria based on the stored user data in the category are approved for use in responding to the verification request, further comprises:
      receiving user inputs selecting privacy settings that indicate: (i) types of verification requests and (ii) requestors for which the stored user data is candidate criteria for responding to verification requests; and
      comparing the type of the verification request and the identity of the requestor to the privacy settings;
   in response to determining that the criteria is approved for use in responding to the verification request, generating, using the control circuitry, the assurance level, in the required type, of the credentials of the user; and
outputting the assurance level for display on a user device.

7. The method of claim 6, further comprising:
determining whether user-provided data corresponding to the verification request was received from the remote server;
in response to determining that the user-provided data corresponding to the verification request was received, determining whether the user-provided data includes the category;
in response to determining that the user-provided data includes the category, verifying the user-provided data in the category using the stored user data; and
in response to verifying the user-provided data in the category, selecting a default algorithm for responding to the verification request, wherein the default algorithm is selected by the requestor.

8. The method of claim 6, further comprising in response to determining that the criteria based on the stored user data in the category are not approved for use in responding to the verification request, querying the requestor for data in the category.

9. The method of claim 6, further comprising:
in response to determining that the stored user data does not include the category, inputting the category into a database listing sources of categories of user data to determine a source to query for the category;
querying the source for source data corresponding to the category; and
receiving the source data corresponding to the category.

10. The method of claim 6, further comprising:
selecting an algorithm for responding to the verification request from a plurality of potential algorithms for responding to the verification request, wherein each of the plurality of potential algorithms uses the criteria and generates assurance levels in the required type, wherein selecting the algorithm, further comprises:
determining a number of verification requests received from the requestor during a time period;
comparing the number of verification requests received from the requestor during the time period to a respective number for each of the plurality of potential algorithms; and
matching the number of verification requests received from the requestor during the time period to the respective number of the selected algorithm.

11. The method of claim 6, further comprising:
selecting an algorithm for responding to the verification request from a plurality of potential algorithms for responding to the verification request, wherein each of the plurality of potential algorithms uses the criteria and generates assurance levels in the required type, wherein selecting the algorithm, further comprises:
determining a time limit for outputting the assurance level;
comparing the time limit to a respective time limit for each of the plurality of potential algorithms; and matching the time limit to the respective time limit for the selected algorithm.

12. The method of claim 6, further comprising:
selecting an algorithm for responding to the verification request from a plurality of potential algorithms for responding to the verification request, wherein each of the plurality of potential algorithms uses the criteria and generates assurance levels in the required type, wherein selecting the algorithm, further comprises:
determining a geographic location of the remote server;
comparing the geographic location to a respective geographic location for each of the plurality of potential algorithms; and
matching the geographic location to the respective geographic location for the selected algorithm.

13. The method of claim 6, further comprising:
selecting an algorithm for responding to the verification request from a plurality of potential algorithms for responding to the verification request, wherein each of the plurality of potential algorithms uses the criteria and generates assurance levels in the required type, wherein selecting the algorithm, further comprises:
determining that the category includes a type of personally identifying information; and
determining that the selected algorithm is approved for personally identifying information.

14. The method of claim 6, further comprising:
selecting an algorithm for responding to the verification request from a plurality of potential algorithms for responding to the verification request, wherein each of the plurality of potential algorithms uses the criteria and generates assurance levels in the required type, wherein selecting the algorithm is based on the type of the verification request, the identity of the requestor, and the required type of the assurance level.

15. A non-transitory computer-readable medium comprising instructions that, when executed by one or more processors, cause operations comprising:
storing user data for a user;
receiving a verification request for credentials of the user, wherein the verification request indicates a type of the verification request, an identity of a requestor of the verification request, and a required type of assurance level of the verification request;
determining a category of required data for the verification request based on the type of the verification request, the identity of the requestor, and the required type of the assurance level;
determining whether the stored user data includes the category;
in response to determining that the stored user data includes the category, determining whether criteria based on the stored user data in the category are approved for use in responding to the verification request, wherein determining whether the criteria based on the stored user data in the category are approved for use in responding to the verification request, further comprises:
receiving user inputs selecting privacy settings that indicate: (i) types of verification requests and (ii) requestors for which the stored user data is candidate criteria for responding to verification requests; and
comparing the type of the verification request and the identity of the requestor to the privacy settings;
in response to determining that the criteria are approved for use in responding to the verification request, generating the assurance level, in the required type, of the credentials of the user; and
outputting the assurance level for display on a user device.

16. The non-transitory computer-readable medium of claim 15, the operations further comprising:
determining whether user-provided data corresponding to the verification request was received;
determining whether the user-provided data includes the category;
verifying the user-provided data in the category using the stored user data; and
selecting a default algorithm for responding to the verification request in response to verifying the user-provided data in the category, wherein the default algorithm is selected by the requestor.

17. The non-transitory computer-readable medium of claim 15, the operations further comprising:
inputting the category into a database listing sources of categories of user data to determine a source to query for the category in response to determining that the stored user data does not include the category;
querying the source for source data corresponding to the category; and
receiving the source data corresponding to the category.

18. The non-transitory computer-readable medium of claim 15, the operations further comprising selecting an algorithm for responding to the verification request from a plurality of potential algorithms for responding to the verification request, wherein each of the plurality of potential algorithms uses the criteria and generates assurance levels in the required type, wherein selecting the algorithm is based on the type of the verification request, the identity of the requestor, and the required type of the assurance level.

* * * * *